United States Patent
Bouru et al.

(10) Patent No.: US 9,328,737 B2
(45) Date of Patent: May 3, 2016

(54) UNDUCTED FAN FOR TURBINE ENGINE

(75) Inventors: Michel Andre Bouru, Montereau sur le Jard (FR); Adrien Jacques Philippe Fabre, Montrouge (FR); Laurent Jablonski, Melun (FR); Jean-Noel Mahieu, Paris (FR)

(73) Assignee: SNECMA, Paris (FR)

( * ) Notice: Subject to any disclaimer, the term of this patent is extended or adjusted under 35 U.S.C. 154(b) by 877 days.

(21) Appl. No.: 13/640,146

(22) PCT Filed: Apr. 1, 2011

(86) PCT No.: PCT/FR2011/050744
§ 371 (c)(1),
(2), (4) Date: Dec. 26, 2012

(87) PCT Pub. No.: WO2011/124832
PCT Pub. Date: Oct. 13, 2011

(65) Prior Publication Data
US 2013/0094943 A1    Apr. 18, 2013

(30) Foreign Application Priority Data

Apr. 9, 2010 (FR) ...................................... 10 01496

(51) Int. Cl.
F01D 7/00      (2006.01)
B64C 11/06     (2006.01)
F04D 29/056    (2006.01)
B64D 27/02     (2006.01)

(52) U.S. Cl.
CPC .............. *F04D 29/056* (2013.01); *B64C 11/06* (2013.01); *B64D 2027/026* (2013.01); *Y02T 50/66* (2013.01)

(58) Field of Classification Search
CPC ........ B64C 11/06; B64C 11/30; B64C 11/48; B64C 11/32; Y02T 50/66; F04D 29/056; F04D 29/059; F04D 29/062; F04D 29/046; F04D 29/049; F01D 7/00
See application file for complete search history.

(56) References Cited

U.S. PATENT DOCUMENTS

| 3,799,698 | A  | * | 3/1974  | Haworth  | F01D 5/021 416/204 R |
| 4,738,591 | A  | * | 4/1988  | Butler   | B64C 11/32 416/129 |
| 5,263,898 | A  | * | 11/1993 | Elston, III | B64C 11/06 416/129 |
| 5,415,527 | A  | * | 5/1995  | Godwin   | B64C 11/06 416/205 |
| 8,827,653 | B2 | * | 9/2014  | Bouru    | 416/204 R |
| 2004/0262112 | A1 | * | 12/2004 | Skorucak | F16D 11/14 192/69.82 |

FOREIGN PATENT DOCUMENTS

| FR | 2 817 233 | 5/2002 |
| GB | 2 226 087 | 6/1990 |

OTHER PUBLICATIONS

International Search Report Issued Jun. 22, 2011 in PCT/FR11/50744 Flled Apr. 1, 2011.

* cited by examiner

*Primary Examiner* — Dwayne J White
*Assistant Examiner* — Joshua R Beebe
(74) *Attorney, Agent, or Firm* — Oblon, McClelland, Maier & Neustadt, L.L.P.

(57) ABSTRACT

An unducted fan of variable-pitch blades including roots engaged from outside in respective radial housings of an annular rotor element and guided to turn about their respective axes by pairs of rolling bearings, one of which is carried by an annular segment of a cylindrical skirt mounted in a groove of the annular body and by a locknut screwed onto the cylindrical skit. The bearing is covered externally by a ring including outer dog-clutch teeth co-operating with inner dog-clutch teeth of the housing to hold the ring axially in the housing. A blocking mechanism is engaged between the teeth of the housing and the teeth of the ring preventing the ring from turning and preventing the ring from being withdrawn axially from the housing.

11 Claims, 5 Drawing Sheets

UNDUCTED FAN FOR TURBINE ENGINE

The present invention relates to a turbine engine fan having variable-pitch blades, the fan being of the unducted or "open rotor" type.

A turbine engine of this type has two outer contrarotating fans on a common axis that are located respectively upstream and downstream, which fans are driven in rotation by respective turbines of the engine and extend substantially radially outside the nacelle of the turbine engine.

Each fan comprises a rotor element having substantially radial cylindrical housings distributed around the longitudinal axis of the engine with fan blade support plates being mounted in the housings. By way of example, each blade includes a root of dovetail section that is engaged axially and that is retained radially in a groove of complementary shape in the plate.

Each plate comprises a substantially cylindrical body that is screwed into a cylindrical ring that is centered and guided in rotation in a housing of the rotor element by means of rolling bearings of the roller- or ball-bearing type.

The plates and the rings are capable of turning in the housings of the rotor elements and they are turned about the axes of the blades by appropriate means so as to adjust the angular pitch of the blades.

That type of mounting is nevertheless unsatisfactory in that the blades are retained radially in the radial housings by the screw threads between the plates and the rings, which threads run the risk of deteriorating rapidly, thereby limiting the lifetime of the fan.

In its application FR 09/01343, the Applicant has already proposed forming teeth projecting from the outer surface of the blade support plate, the plate being engaged in a radial housing from the outside and the teeth of the plate co-operating with complementary teeth on the inner surface of a ring engaged in the housing from the inside.

Nevertheless, in that type of configuration, dismantling the blades requires prior access to the ring for radially blocking the plate, which ring is mounted from the inside of the housing, thereby requiring elements of the rotor hub to be dismantled. Under such circumstances, it is not possible for blades to be dismantled simply and quickly during a stopover, e.g. while the airplane is stationed in an airport.

Under certain circumstances, for example when the blade is made out of a woven carbon fiber composite material, it is not possible to make a dovetail-shaped blade root, and the root is generally of cylindrical shape.

Thus, in application FR 10/50234 in the name of the Applicant, the cylindrical blade root includes an annular collar at its inner end. An inner bearing ring is mounted tight around the root and includes an annular collar at its bottom end that co-operates with the annular collar of the root in order to hold the root radially. The inner ring is connected via bearing balls to two outer rings that are axially spaced apart and fastened by being screwed into the radial housing.

In that embodiment, the bearing balls are inserted one by one from the inside of the housing into the space that lies between the inner and outer rings, thereby requiring a considerable length of time in order to put each blade into place. Furthermore, handling each bearing ball can lead to polluting elements being inserted between the inner and outer rings, e.g. abrasive dust that might damage the balls and their raceways.

A particular object of the invention is to provide a solution to those problems that is simple, effective, and inexpensive.

To this end, the invention provides an unducted fan for a turbine engine that has fan blades mounted to turn about their respective axes in radial housings of an annular rotor element, each blade having a root with a cylindrical body engaged from the outside in a radial housing and guided to turn about its axis in the housing by two rolling bearings, the fan being characterized in that a first bearing is carried by an annular rim of the radial inner end of the housing, in that the second bearing is carried by an annular segment of a cylindrical skirt mounted in a groove of the cylindrical body and by a locknut screwed onto the cylindrical skirt of the segment and forming a spacer bearing against the first bearing, the second bearing being covered on the outside by a ring surrounding the cylindrical body of the blade root and including outer dog-clutch teeth co-operating with inner dog-clutch teeth of the housing in order to retain the ring axially in the housing, and in that blocking means are engaged between the dog-clutch teeth of the housing and between the dog-clutch teeth of the ring in order to prevent the ring from turning and being extracted axially from the housing.

Unlike the prior art, the first rolling bearing is mounted in the assembled state into the housing from the outside onto a rim of the radially inner end of the housing. The second bearing, also in the assembled state, is mounted around the root and is carried by the annular segment mounted in the annular groove and held therein by the nut screwed on the cylindrical skirt of the annular segment.

The assembly constituted by the blade, the second bearing, the annular segment, and the nut is engaged axially in the radial housing from the outside. The blade is blocked radially in the housing by a ring that is not mounted from the inside of the housing as in the prior art, but rather from the outside of the housing. The ring has a set of dog-clutch teeth engaged and blocked to bear radially against a complementary set of teeth of the housing, suitable for withstanding the centrifugal forces that are applied to the blade in operation.

In order to enable the blade to be mounted in the housing from the outside of the ring, it can be understood that the ring needs to be mounted around the root before the second bearing is mounted around the blade root. The ring is thus mounted and put into a waiting position around the root until it is fastened in the radial housing by means of the dog-clutch teeth.

The blades are thus retained radially not by means of a thread, but rather by a system of dog-clutch teeth, and the operations of mounting and dismantling blades may advantageously be performed on an engine that is mounted on an airplane, and from the outside without taking action on the hub of the rotor, since the ring is mounted from the outside.

According to another characteristic of the invention, an annular cover surrounding the blade root is screwed onto the outer end of the housing in order to prevent the blocking means being withdrawn axially. Screw fastening the cover does not present any difficulty, since it serves for radially retaining only the blocking means and not for radially retaining the blades, so the screw fastening is thus not subjected to the stress of transmitting centrifugal forces from the blades in operation.

According to yet another characteristic of the invention, the annular segment comprises two portions mounted end to end in the groove of the blade body.

The cylindrical skirt of the annular segment may include at least one axially-projecting tooth engaged in a setback of the cylindrical body and leading into the annular groove so as to prevent the segment from turning on the cylindrical body.

A lockwasher is advantageously interposed between the nut and the annular segment and co-operates by interfitting shapes with the nut and with the segment so as to prevent the nut from turning on the blade root.

In a particular embodiment of the invention, the ring has three dog-clutch teeth regularly distributed about its axis, each having an angular extent of about 60°.

The blocking means for preventing the ring from turning in the housing may comprise spacers in the form of sectors of a cylinder that are engaged by moving in axial translation from the outside between the dog-clutch teeth of the ring and the dog-clutch teeth of the housing. Each spacer is inserted between two consecutive teeth of the ring and between two consecutive teeth of the housing, e.g. by being moved in translation in a direction parallel to the axis of the housing. These spacers co-operate by coming into abutment in the circumferential direction with the circumferential ends of the teeth both of the ring and of the housing so as to prevent the ring from turning in the housing.

Another lockwasher is advantageously interposed between the cover and the ring and co-operates by interfitting shapes with the cover and with the ring in order to secure the cover in rotation with the ring.

According to another characteristic of the invention, the blade root is hollow and includes metal reinforcements fastened on its inner and outer faces by adhesive. By way of example, reinforcements of this type may be used with a blade made of carbon fiber composite material. Under such circumstances, the annular groove for receiving the cylindrical skirt of the annular segment is formed in the outer surface of the outer reinforcement.

Advantageously, the wall of the blade root is of substantially constant thickness and includes undulations co-operating with complementary undulations of the reinforcements. These undulations act by co-operating shapes to provide better fastening of the reinforcements on the blade roots.

The invention also provides a turbine engine, such as an airplane turbojet or turboprop, that includes at least one fan as described above.

The invention can be better understood and other details, advantages, and characteristics of the invention appear on reading the following description made by way of non-limiting example and with reference to the accompanying drawings, in which.

Figure 1:
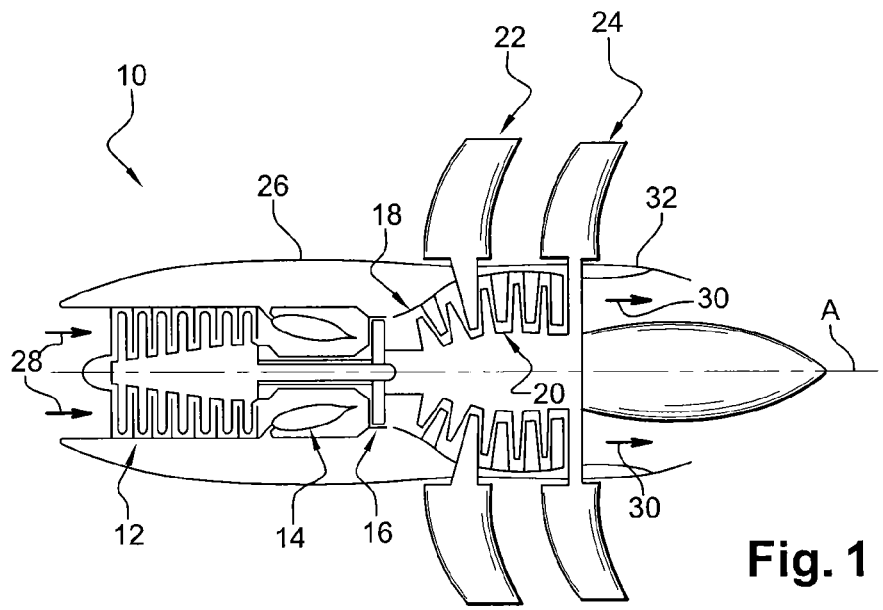
FIG. 1 is a diagrammatic axial section view of a turbine engine having unducted fans.

Reference is made initially to FIG. 1, which shows a' turbine engine 10 having unducted fans, also referred to as "open rotors", and comprising from upstream to downstream in the flow direction of gas through the turbine engine: a compressor 12; an annular combustion chamber 14; a high pressure turbine 16; and two low pressure turbines 18 and 20 that are contrarotating, i.e. that rotate in two opposite directions about the longitudinal axis A of the turbine engine.

Each of these downstream turbines 18 and 20 drives an external fan 22, 24 in rotation, which fan extends radially outside the nacelle 26 of the turbine engine, the nacelle 26 being substantially cylindrical and extending along the axis A around the compressor 12, the combustion chamber 14, and the turbines 16, 18, and 20.

The stream of air 28 that penetrates into the engine is compressed and then mixed with fuel and burnt in the combustion chamber 14, the combustion gas then passing through the turbines in order to drive the fans 22 and 24 in rotation, which fans deliver the major fraction of the thrust generated by the turbine engine. The combustion gas leaving the turbines is expelled through a nozzle 32 (arrows 30) in order to increase the thrust.

The fans 22 and 24 are arranged on a common axis one behind the other, and each of them comprises a plurality of blades regularly distributed around the axis A of the turbine engine. These blades extend substantially radially and they are of variable pitch, i.e. they are capable of turning about their respective axes so as to optimize their angular positions as a function of the operating conditions of the turbine engine.

According to the invention, and as shown in FIGS. 2 to 5, each fan comprises a rotor element constituted by a polygonal ring 34 that extends around the axis A of the engine and that includes a plurality of substantially cylindrical radial housings 36 in which the roots of the fan blades are engaged.

The root 38 of each blade is hollow and comprises a substantially cylindrical body 40 engaged in a radial housing 36 of the polygonal ring 34. An annular collar 42 is formed at the radially inner end of the root 38. The cylindrical body 40 has two metal reinforcements 44 and 46. The first reinforcement 44 includes an annular collar 48 at its bottom end and is engaged inside the root by being moved in radial translation so that its collar comes into contact with the annular collar 42 of the root. The second metal reinforcement 46 is mounted outside the root and around it, and its bottom end is positioned in axial abutment against the annular collar 42 of the root 38. By way of example, the metal reinforcements 44 and 46 are fastened to the root by means of adhesive.

The outer metal reinforcement 46 includes an outer annular groove 50 and two diametrically-opposite setbacks 52. These setbacks 52 are formed in the bottom rim of the annular groove 50 and they open out into its inside.

An annular segment 54 is mounted in the annular groove 50 and comprises a cylindrical skirt 56 connected at its radially outer end to a radial annular rim 58 including four regularly-distributed notches 60 in its periphery. The inner end of the cylindrical skirt has two teeth 62 projecting axially towards the inside of the housing, which teeth are diametrically opposite each other. These teeth 62 are engaged in the setbacks 52 of the outer metal reinforcement 46. The outer surface of the cylindrical skirt 56 includes a screw thread for engaging a nut 64 for locking the annular segment 54 in the annular groove 50.

The annular segment 54 is made of two portions 66 and 68 so as to enable it to be mounted in the annular groove 50 of the blade body.

Preferably, the annular segment 54 is made as a single piece and then the thread is formed on the outside surface of the cylindrical skirt 56 of the annular segment 54. The annular segment 54 is then cut into two portions each occupying an angular extent of 180°. Making the thread on a one-piece annular segment 54 serves to guarantee that the threads on each of the two portions 66 and 68 of the segment 54 are in alignment when the segment is mounted in the annular groove 50 of the blade body.

A first washer 70 is interposed axially between the nut 64 and the annular rim 58 of the annular segment 54, and on its outer periphery it includes first tabs 72 that are folded outwards and engaged in the notches 60 of the annular rim 58 of the annular segment 54 so as to prevent the washer 70 from moving relative to the annular segment 54.

On its outer periphery, the first washer 70 also includes second tabs 74 that are folded inwards and that are engaged between the teeth on the outer periphery of the nut 64 so as to prevent the washer 70 from turning relative to the nut 64 screwed onto the segment 54.

A first ball bearing 76 is mounted inside the radial housing and is carried by an annular rim 78 of the radially inner end of the housing 36. A ring 80 of the bearing 76 bears against a prestressed washer 82 interposed between the annular rim 78 of the housing and the bearing 76. This prestressed washer 82 limits impacts against the annular rim of the housing and has a thickness of the order of 0.5 millimeters (mm) to 0.8 mm. The other ring 84 of the bearing 76 is in contact with the radially inner end of the nut 64 and also with the outer metal reinforcement 46 of the blade root. The inner periphery of the annular rim 78 of the housing includes an annular groove 86 in which an annular sealing ring (not shown) is mounted in contact with the cylindrical body of the blade root. An annular groove 88 is also formed in the inner face of the annular rim 78 of the housing and includes another annular sealing ring (not shown) co-operating with an inner annular cover 90 that is screwed from the inside against the outer periphery of the rim 78. The inner cover 90 includes a central opening 92 for passing means for setting the angular position of the blade. A second bearing 94 bears via its inner ring 95 against the outer surface of the annular rim 58 of the annular segment 54. The outer ring 96 of this second bearing bears against an inner surface of a radial annular rim 98 of a ring 100 covering the second bearing 94. The annular rim 98 of the ring 100 includes an annular groove 102 in its inner periphery in which there is housed an annular sealing ring (not shown) co-operating with the top end of the body of the blade root.

The ring 100 has a top portion 104 including a plurality of notches 106 in its inner periphery that are regularly distributed around the axis of the ring 100. Radially outwardly-projecting dog-clutch teeth 108 are formed on the outer cylindrical surface of the ring. There are three of these teeth 108 in the embodiment shown in the figures, and each of them extends over an angle of about 60°.

The radial housing also includes three dog-clutch teeth 112 that are regularly distributed around the axis D. of the radial housing. These teeth 112 are formed on a cylindrical inner surface of the housing and each of them extends over an angle of about 60°.

When the engine is stopped, the ring 100 bears axially against an annular shoulder 110 of the housing and axial clearance exists between the dog-clutch teeth 108 of the ring 100 and the dog-clutch teeth 112 of the radial housing. This axial clearance is necessary to enable the ring 100 to be mounted in the radial housing. In operation, centrifugal force urges the dog-clutch teeth 108 of the ring 100 to bear axially against the dog-clutch teeth 112 of the radial housing.

Blocking spacers 114 such as cylindrical sectors are engaged axially between the dog-clutch teeth 108 of the ring 100 and the dog-clutch teeth 112 of the housing, and they come into axial abutment against the shoulder 110 of the housing. In the embodiment shown in the figures, the spacers 114 extend angularly over about 60° and their axial dimension is sufficient for the spacers to be interposed circumferentially between the dog-clutch teeth 108 of the ring 100 and the dog-clutch teeth 112 of the housing.

An annular cover 116 is screwed onto the radially outer end of the housing and includes notches 118 that are regularly distributed in its inner periphery.

A second washer 120 is interposed between the ring 100 and the cover 116 and includes first tabs 122 that are folded outwards into the notches 118 of the cover 116, and second tabs 124 that are folded inwards into the notches 106 of the ring 100. This prevents the cover 116 from turning on the ring 100, which is itself prevented from turning in the housing by the blocking spacers 114.

Annular grooves 126 are provided in the outer periphery of the housing and in the top portion of the ring, and they receive annular sealing rings (not shown) that co-operate with the inner surface of the outer annular cover 116.

A blade is mounted in a radial housing of the polygonal ring 100 as follows (FIGS. 6 to 11).

Figure 6:
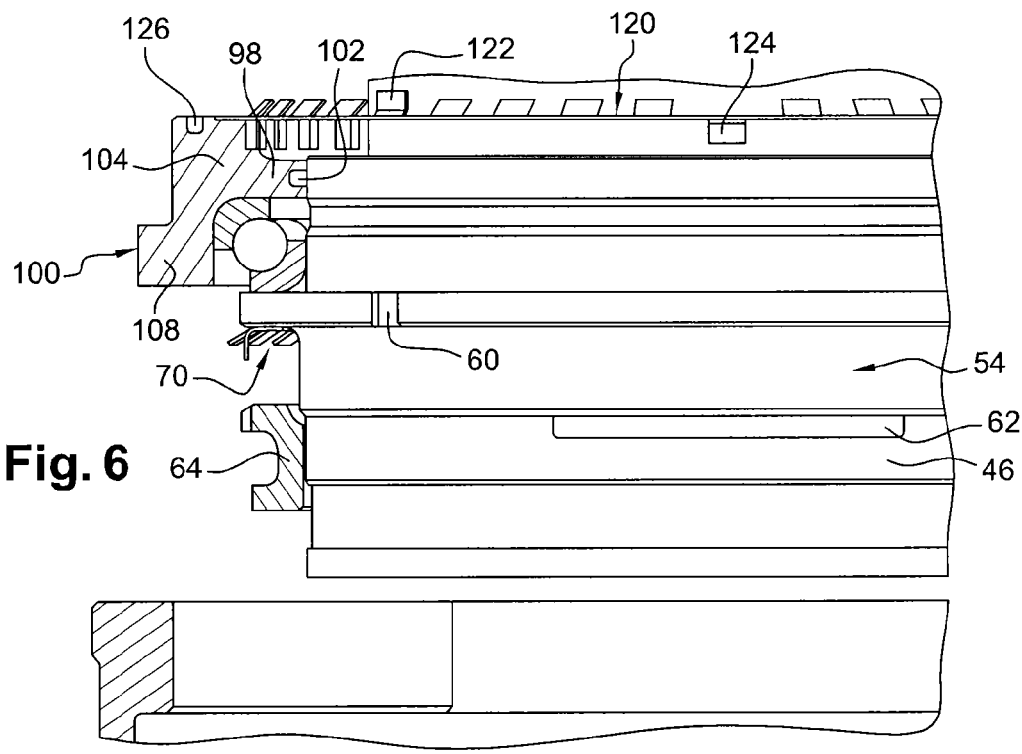
FIGS. 6 to 11 are diagrammatic perspective views that are partially cut away, showing the rotor element, the blade root supporting a ball bearing, the blocking ring, and the top cover of FIG. 2, and showing steps in mounting those elements.
Figure 7:
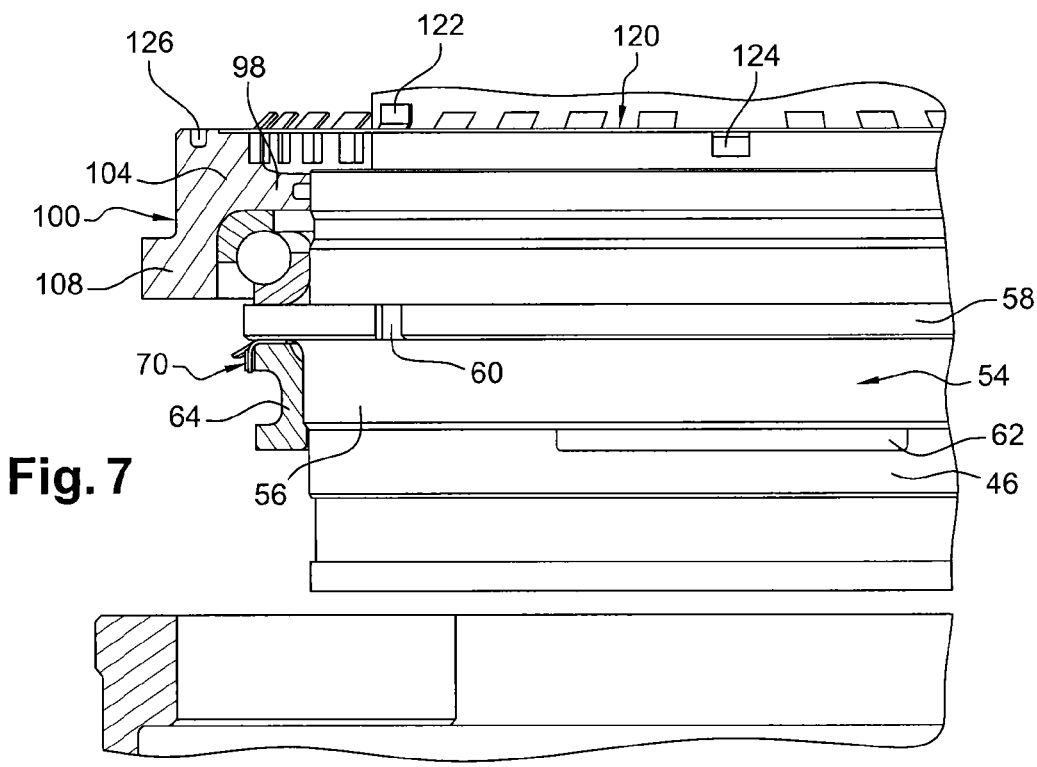
Figure 8:
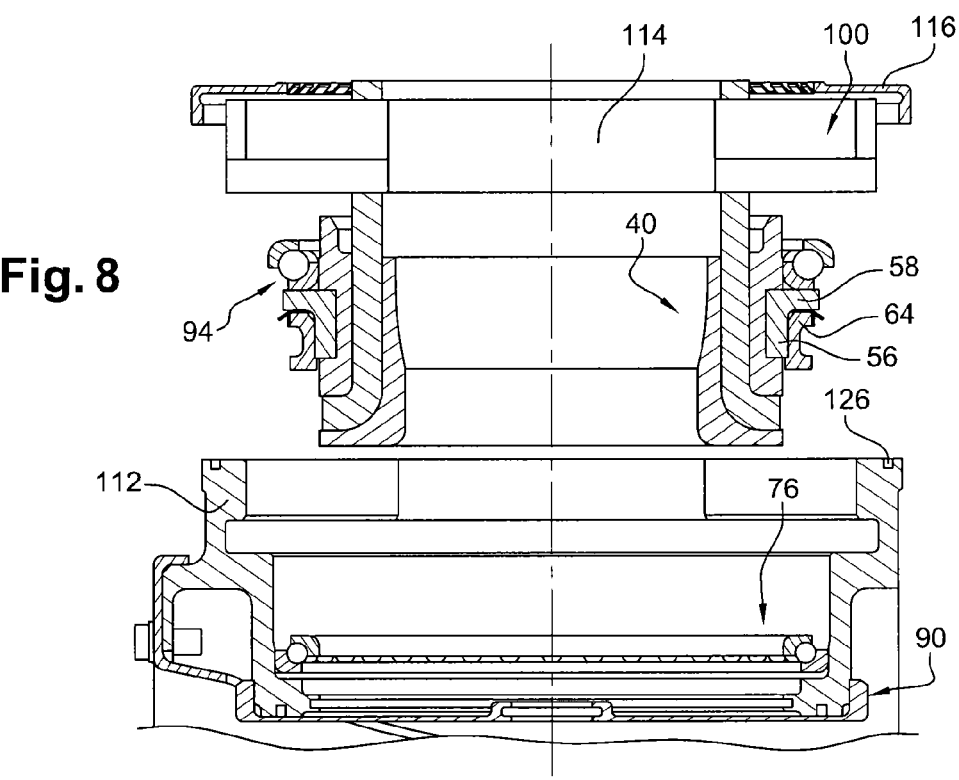

Firstly, the outer annular cover 116, the second washer 120, and the blocking ring 100 are moved in translation to be engaged around the root 38 from its bottom end, and they are left ready for later use. The second bearing 94 is mounted as a single piece around the blade root. The two portions 66 and 68 of the annular segment are arranged end to end in the annular groove of the outer metal reinforcement 46 so that the teeth 62 of the cylindrical skirt 56 penetrate into the setbacks 52 of the groove 50 so as to prevent the annular segment 54 from turning in the annular groove (FIG. 6). The first washer 70 is mounted around the root and the nut 64 is screwed onto the cylindrical skirt 56 of the annular segment. The first and second tabs 72 and 74 of the first washer 70 are folded to prevent the nut 64 from turning on the annular segment 54 (FIG. 7).

In other operations, the prestressed washer 82 has also been mounted in the radial housing and the first bearing 76 has been mounted in the assembled state on the annular rim 78.

Figure 9:
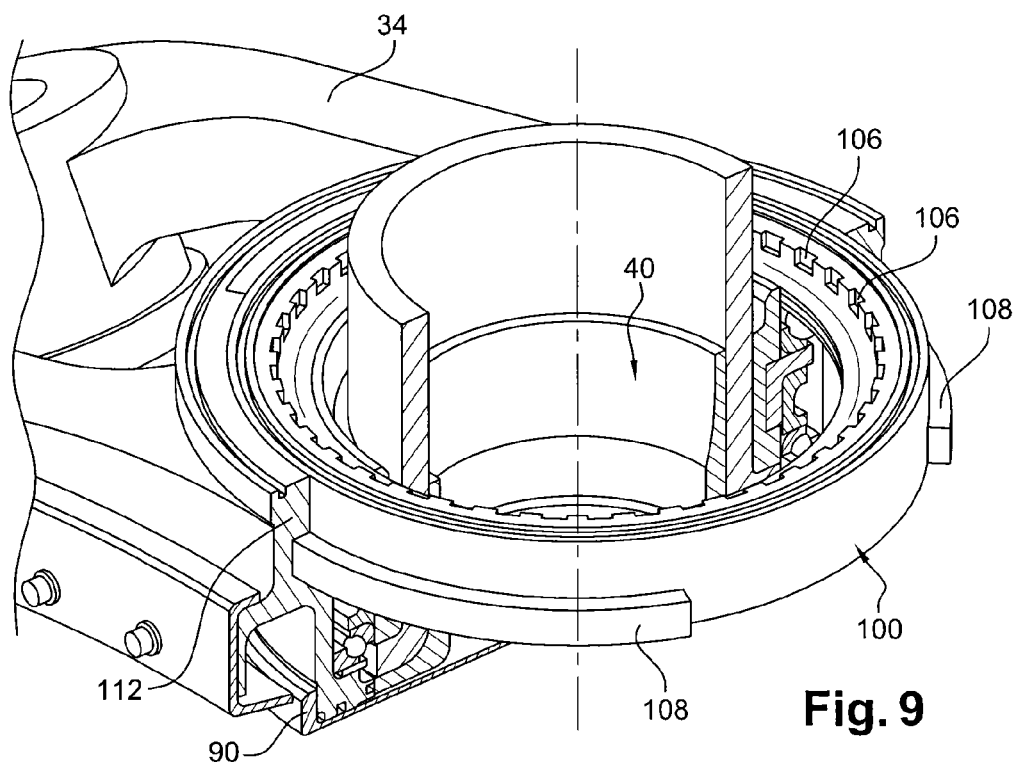
Figure 10:
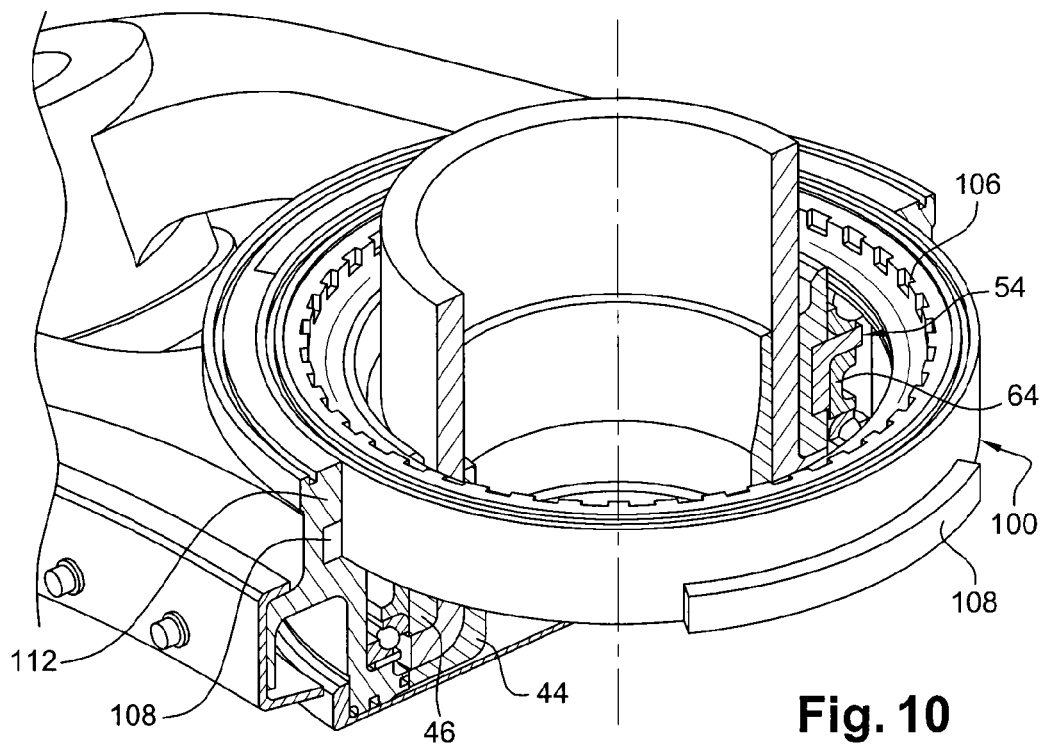
Figure 11:
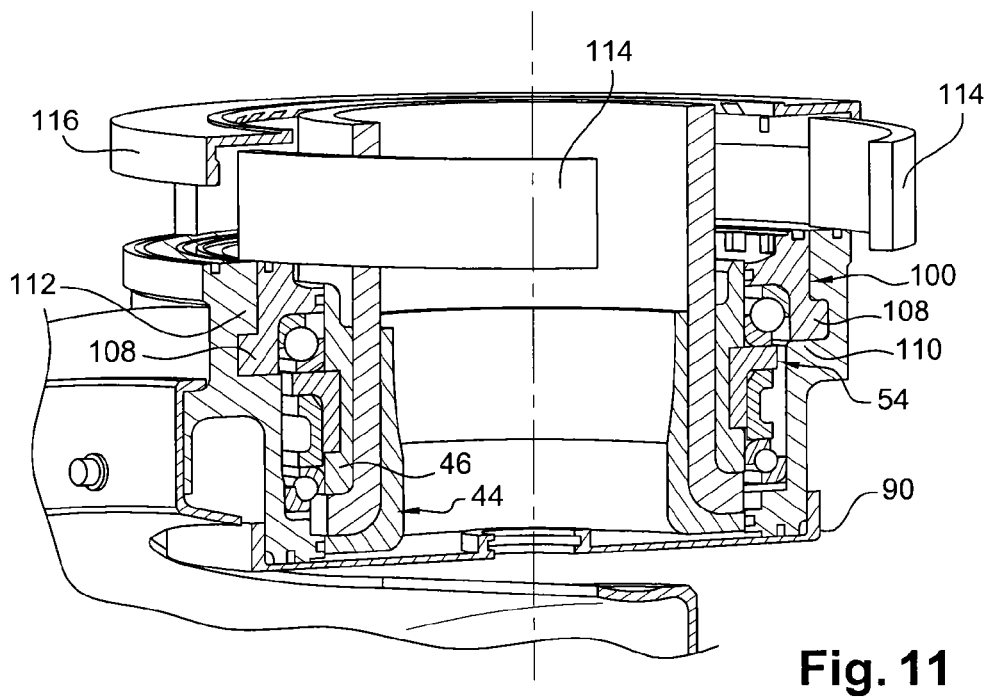

Thereafter, the blade root is engaged axially in the radial housing (FIG. 8), the nut 64 forming a spacer bearing against the first bearing 76. The blocking ring 100 is angularly positioned so its dog-clutch teeth 108 engage axially between the dog-clutch teeth 112 of the housing (FIG. 9). The blocking ring 100 is then inserted axially so as to come into axial abutment against the annular shoulder 110 of the housing, and then it is turned through an angle of 60° corresponding to the angular extent of the dog-clutch teeth so as to block the ring 100 axially in the radial housing (FIG. 10). The three blocking spacers 114 are engaged axially from the outside between the dog-clutch teeth 108 of the ring 100 and the dog-clutch teeth 112 of the housing so as to prevent the ring 100 from turning in the radial housing (FIGS. 4 and 11), these spacers 114 also coming into axial abutment against the annular shoulder 110 of the housing.

Figure 2:
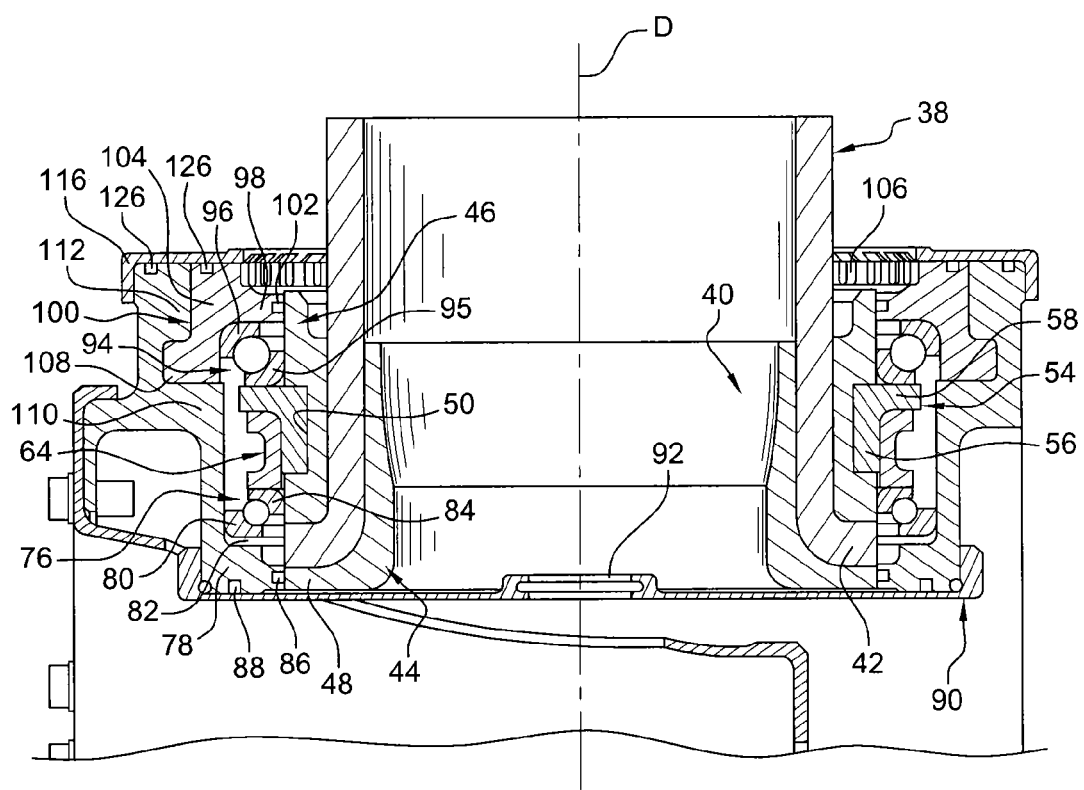
FIG. 2 is a diagrammatic section view on a plane containing the axis of a radial housing of a rotor element in which a blade of a fan of the invention is mounted and fastened.
Figure 3:
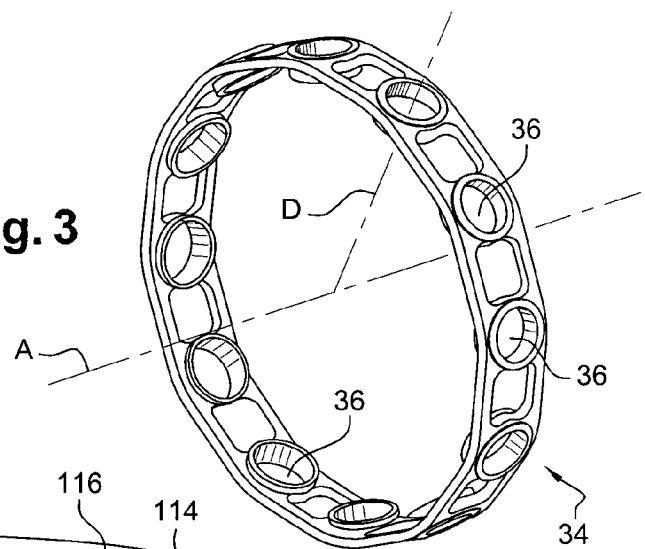
FIG. 3 is a diagrammatic perspective view of the FIG. 2 rotor element.
Figure 4:
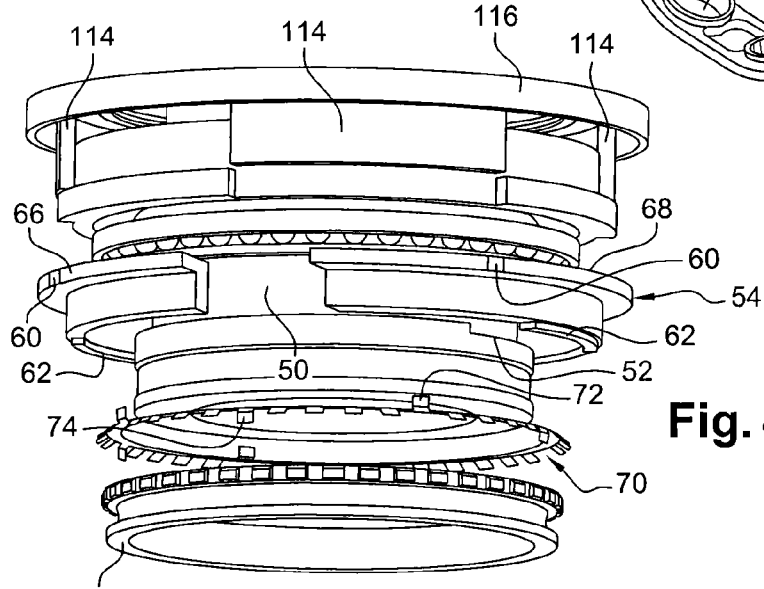
FIG. 4 is an exploded diagrammatic perspective view of the various parts shown in FIG. 2, without the rotor element.
Figure 5:
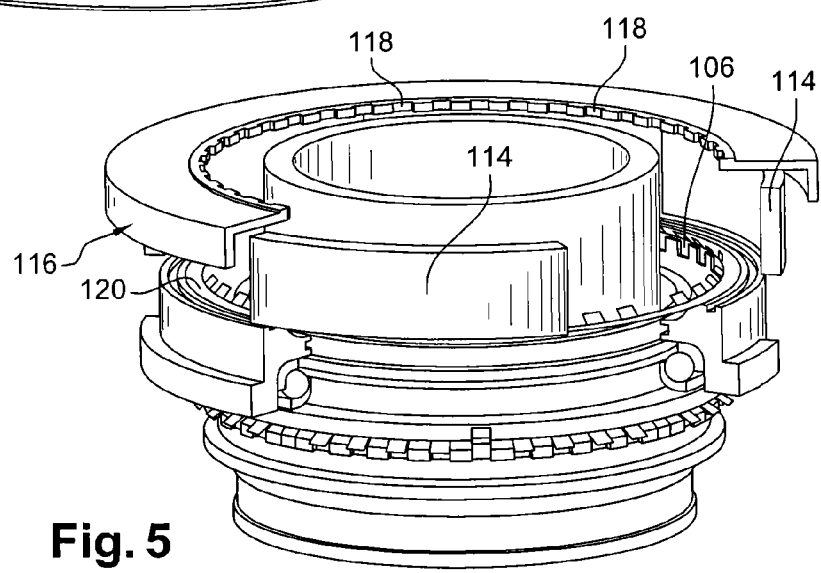
FIG. 5 is another diagrammatic perspective view that is exploded and partially cut away, showing the various parts of FIG. 2 without the rotor element.

Finally, the outer cover 116 is screwed onto the outside of the housing and the tabs 122 and 124 of the second washer are then folded to prevent the cover 116 from turning on the ring 100 (FIG. 2).

According to the invention, all of the parts needed for fastening the blade root in its radial housing are mounted from the outside of the housing, thereby making it possible, during a stopover, to dismantle blades quickly from an engine that remains mounted on an airplane. Furthermore, the ball bearings 76 and 94 are mounted while they are in the assembled state, and no longer ball-by-ball as in the prior art, thereby limiting any risk of abrasive elements being introduced into the bearings.

The centrifugal forces on the blades in operation are transmitted by the dog-clutch teeth 108 of the ring 100 bearing against the dog-clutch teeth 112 of the housing and not via screw threads, thereby increasing the lifetime of the fan as assembled in this way.

In a variant embodiment of the invention, the blade root is of substantially constant thickness and includes undulations that co-operate with complementary undulations of the metal reinforcements so as to increase adhesion between the blade root and the inner and outer metal reinforcements. The radius of curvature of the undulations is advantageously greater than 4 mm.

The blades may be made by weaving a carbon fiber composite material.

In the embodiment described with reference to the figures, the ring 100 has a single annular row of dog-clutch teeth 108. Nevertheless, the invention also covers the embodiments in which the blocking ring 100 has two annular rows of dog-clutch teeth 108 that are axially spaced apart from each other, each co-operating with an annular row of dog-clutch teeth of the housing. In a first configuration, the two rows of dog-clutch teeth contribute simultaneously to holding the blade radially. In a second configuration, the teeth of one of the two rows bear against the teeth of one row of the housing, while the dog-clutch teeth of the other row are spaced apart axially a little during mounting from the dog-clutch teeth of the other row of the housing and their purpose is to hold the blade radially and transmit centrifugal forces in the event of teeth of the first row of the blocking ring breaking. This type of configuration is described in detail in the prior patent application No. FR 09/04126 in the name of the Applicant.

In order to withstand centrifugal forces of the order of 30 (metric) tonnes in operation, the dog-clutch teeth 108 of the blocking ring 100 shown in the figures have an axial thickness of the order of 12 mm. In the event of the blocking ring 100 having two rows of dog-clutch teeth that bear simultaneously, the axial thickness of the dog-clutch teeth is then halved and is about 6 mm.

The invention claimed is:

1. An unducted fan for a turbine engine, comprising:
    fan blades mounted to turn about their respective axes in radial housings of an annular rotor element, each blade including a root with a cylindrical body engaged from outside in a radial housing and guided to turn about its axis in the housing by first and second rolling bearings,
    wherein the first bearing is carried by an annular rim of the radial inner end of the housing,
    the second bearing is carried by an annular segment of a cylindrical skirt mounted in a groove of the cylindrical body and by a locknut screwed onto the cylindrical skirt of the segment and forming a spacer bearing against the first bearing, the second bearing being covered on the outside by a ring surrounding the cylindrical body of the blade root and including outer dog-clutch teeth co-operating with inner dog-clutch teeth of the housing to retain the ring axially in the housing, and
    blocking means are engaged between the dog-clutch teeth of the housing and between the dog-clutch teeth of the ring to prevent the ring from turning and being extracted axially from the housing.

2. A fan according to claim 1, further comprising an annular cover surrounding the blade root screwed onto the outer end of the housing to prevent the blocking means from being withdrawn axially.

3. A fan according to claim 1, wherein the annular segment comprises two portions mounted end to end in the groove of the blade body.

4. A fan according to claim 3, wherein the cylindrical skirt of the annular segment includes at least one axially-projecting tooth engaged in a setback of the cylindrical body and leading into the annular groove to prevent the segment from turning on the cylindrical body.

5. A fan according to claim 1, further comprising a lockwasher interposed between the nut and the annular segment and that co-operates by interfitting shapes with the nut and with the segment to prevent the nut from turning on the blade root.

6. A fan according to claim 1, wherein the ring includes three dog-clutch teeth regularly distributed about its axis, each having an angular extent of about 60°.

7. A fan according to claim 1, wherein the blocking means comprises spacers in a form of sectors of a cylinder engaged by moving in axial translation from outside between the dog-clutch teeth of the ring and the dog-clutch teeth of the housing.

8. A fan according to claim 2, further comprising a lockwasher interposed between the cover and the ring and that co-operates by interfitting shapes with the cover and with the ring to secure the cover in rotation with the ring.

9. A fan according to claim 1, wherein the blade root is hollow and includes metal reinforcements fastened on its inner and outer faces by adhesive.

10. A fan according to claim 9, wherein a wall of the blade root is of substantially constant thickness and includes undulations co-operating with complementary undulations of the reinforcements.

11. A turbine engine, or an airplane turbojet, or turboprop, comprising at least one fan according to claim 1.

* * * * *